(12) United States Patent
Santamarina et al.

(10) Patent No.: US 8,602,285 B2
(45) Date of Patent: *Dec. 10, 2013

(54) ANCHOR INSTALLATION TOOL

(75) Inventors: Aland Santamarina, Columbia, MD (US); Scott Muhlbaier, Baltimore, MD (US); Mark E. Brunson, Bel Air, MD (US); Darren B. Moss, York, PA (US)

(73) Assignee: Black & Decker, Newark, DE (US)

( * ) Notice: Subject to any disclaimer, the term of this patent is extended or adjusted under 35 U.S.C. 154(b) by 407 days.

This patent is subject to a terminal disclaimer.

(21) Appl. No.: 12/916,972

(22) Filed: Nov. 1, 2010

(65) Prior Publication Data

US 2011/0089218 A1    Apr. 21, 2011

Related U.S. Application Data

(63) Continuation-in-part of application No. 12/134,439, filed on Jun. 6, 2008, now Pat. No. 8,061,000.

(51) Int. Cl.
*B25B 27/14*    (2006.01)
(52) U.S. Cl.
USPC ............. 227/139; 227/147; 173/29; 173/128; 279/14; 279/82; 29/254; 29/275; 81/463
(58) Field of Classification Search
USPC ............ 227/139, 147, 156; 173/29, 128, 109, 173/28; 29/275, 254, 278, 271; 81/463, 81/438; 279/143, 49, 82, 14
See application file for complete search history.

(56) References Cited

U.S. PATENT DOCUMENTS

| 1,089,112 | A | 3/1914 | Coutant |
| 1,697,414 | A | 1/1929 | Cordray |
| 1,765,729 | A | 6/1930 | Morte |
| 1,925,385 | A | 9/1933 | Humes et al. |
| 2,093,261 | A | 9/1937 | Willson |
| 2,114,451 | A | 4/1938 | Mattes |
| 2,445,674 | A | 7/1948 | Kendall |
| 2,543,942 | A | 3/1951 | Shaff |
| 2,575,079 | A | 11/1951 | Temple |
| 2,638,591 | A | 5/1953 | Harris |
| 2,641,379 | A | 6/1953 | Barbaro |
| 3,042,004 | A | 7/1962 | Fischer et al. |
| 3,163,865 | A | 1/1965 | Zetzer et al. |
| 3,177,952 | A | 4/1965 | West |
| 3,370,655 | A | 2/1968 | Chromy |

(Continued)

FOREIGN PATENT DOCUMENTS

| DE | 295 07 697 | 8/1965 |
| DE | 1 939 482 | 6/1970 |

(Continued)

*Primary Examiner* — Scott A. Smith
(74) *Attorney, Agent, or Firm* — Scott B. Markow

(57) ABSTRACT

An anchor installation tool has an elongated driving member with a body portion and a head portion. A retaining mechanism retains the anchor installation to the drill bit. The mechanism has a housing on the body portion with a pair of bias lugs that project through the body portion to contact the drill bit. An anchor guide slides on the body and head portion and has a holding member to hold an anchor. The anchor is held in the anchor guide and a drill bit is inserted into the driving member. Axial movement of the drill bit is transferred into axial movement of the driving member. The movement strikes the anchor and ejects the anchor from the anchor guide into a surface.

19 Claims, 7 Drawing Sheets

(56) References Cited

U.S. PATENT DOCUMENTS

| | | |
|---|---|---|
| 3,503,549 A | 3/1970 | Brunelle |
| 3,534,640 A | 10/1970 | Macy |
| 3,574,915 A | 4/1971 | Jeal |
| 3,579,677 A | 5/1971 | Ullman |
| 3,602,419 A | 8/1971 | Doberne et al. |
| 3,618,445 A | 11/1971 | Hartmann et al. |
| 3,847,193 A | 11/1974 | Brunstetter |
| 3,861,014 A | 1/1975 | Summerlin |
| 3,965,510 A | 6/1976 | Ernst |
| 4,007,795 A | 2/1977 | Gawron et al. |
| 4,107,800 A | 8/1978 | Jorgensen |
| 4,127,000 A | 11/1978 | Montgomery, Jr. et al. |
| 4,201,072 A | 5/1980 | Snell |
| 4,218,795 A | 8/1980 | Ernst et al. |
| 4,289,010 A | 9/1981 | Badger |
| 4,367,778 A | 1/1983 | Bradbury |
| 4,422,489 A | 12/1983 | Ross |
| 4,448,339 A | 5/1984 | Pettigrew |
| 4,468,826 A | 9/1984 | Moores, Jr. |
| 4,512,693 A | 4/1985 | Swanson |
| 4,551,875 A | 11/1985 | Getz et al. |
| 4,637,539 A | 1/1987 | Turcott et al. |
| 4,676,424 A | 6/1987 | Meador et al. |
| 4,676,703 A | 6/1987 | Swanson |
| 4,867,249 A | 9/1989 | Watkins, Jr. et al. |
| 4,890,779 A | 1/1990 | Giannuzzi |
| 4,899,431 A | 2/1990 | Borntrager |
| 4,954,025 A | 9/1990 | Crawford et al. |
| 5,011,354 A | 4/1991 | Brownlee |
| 5,030,043 A | 7/1991 | Fischer et al. |
| 5,038,435 A | 8/1991 | Crawford et al. |
| 5,050,286 A | 9/1991 | Miyanaga |
| 5,142,954 A | 9/1992 | Starke |
| 5,161,624 A | 11/1992 | Beck et al. |
| 5,165,588 A | 11/1992 | Rowland |
| 5,184,385 A | 2/1993 | Valesh |
| 5,588,788 A | 12/1996 | Dominguez |
| 5,711,043 A | 1/1998 | Crawford et al. |
| 5,913,792 A | 6/1999 | Fischer |
| 5,918,789 A | 7/1999 | Olvera et al. |
| 5,979,735 A | 11/1999 | Olvera et al. |
| 5,979,913 A | 11/1999 | Kosik et al. |
| 6,053,675 A | 4/2000 | Holland et al. |
| 6,062,789 A | 5/2000 | Pope |
| 6,220,122 B1 | 4/2001 | Forsell |
| 6,223,375 B1 | 5/2001 | Vaughan, Jr. |
| 6,457,926 B1 | 10/2002 | Pope |
| 6,585,143 B1 | 7/2003 | Schultz |
| 6,668,941 B2 | 12/2003 | Phillips et al. |
| 6,695,321 B2 | 2/2004 | Bedi et al. |
| 6,848,346 B1 | 2/2005 | Panasik |
| 6,877,937 B2 | 4/2005 | Hsiao |
| 6,915,936 B2 | 7/2005 | Estes |
| 6,928,778 B2 | 8/2005 | Schmid |
| 6,935,821 B2 | 8/2005 | Bodin et al. |
| 7,065,855 B2 | 6/2006 | Janusz |
| 7,086,813 B1 | 8/2006 | Boyle et al. |
| 7,121,357 B1 | 10/2006 | Raimondi |
| 7,127,972 B2 | 10/2006 | Klein et al. |
| 7,237,987 B2 | 7/2007 | Hernandez, Jr. et al. |
| 7,354,230 B2 | 4/2008 | Bauman |
| 7,374,377 B2 | 5/2008 | Bauman |
| 7,404,563 B2 | 7/2008 | Hernandez, Jr. et al. |
| 7,407,073 B2 | 8/2008 | Rafaeli |
| 8,061,000 B2 * | 11/2011 | Santamarina et al. ......... 29/275 |
| 2001/0029634 A1 | 10/2001 | Lamarre |
| 2002/0124371 A1 | 9/2002 | Livingston |
| 2004/0056435 A1 | 3/2004 | Bedi et al. |
| 2004/0105734 A1 | 6/2004 | Yekutiely et al. |
| 2004/0134312 A1 | 7/2004 | Hodges |
| 2005/0051596 A1 | 3/2005 | Estes |
| 2005/0163585 A1 | 7/2005 | Bodin et al. |
| 2005/0178244 A1 | 8/2005 | Hodges |
| 2006/0048611 A1 | 3/2006 | Berdin et al. |
| 2006/0213014 A1 | 9/2006 | Manske |
| 2008/0023924 A1 | 1/2008 | Chiang |
| 2008/0173141 A1 | 7/2008 | Wallek |
| 2009/0302088 A1 | 12/2009 | Santamarina et al. |

FOREIGN PATENT DOCUMENTS

| | | |
|---|---|---|
| DE | 2 400 287 | 7/1974 |
| DE | 27 00 877 | 8/1977 |
| DE | 8903996 U | 8/1990 |
| DE | 39 14 512 | 11/1990 |
| DE | 91 10 513.7 | 2/1993 |
| DE | 199 04 849 | 8/2000 |
| DE | 100 00 059 | 10/2001 |
| DE | 202 18 422 | 5/2004 |
| EP | 392 201 | 3/1990 |
| EP | 399 164 | 3/1990 |
| EP | 955 130 | 4/1999 |
| EP | 1 281 481 | 6/2002 |

* cited by examiner

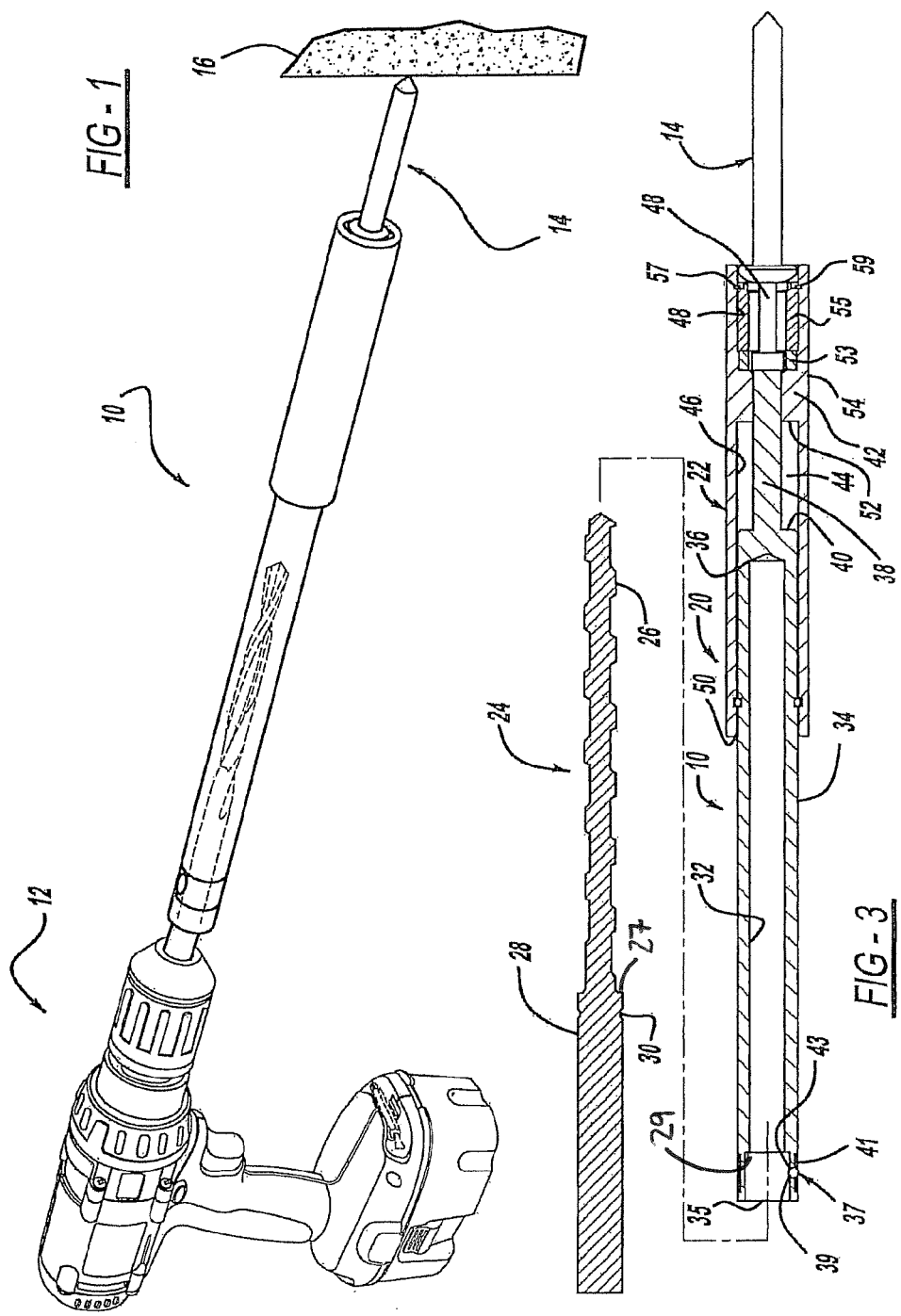

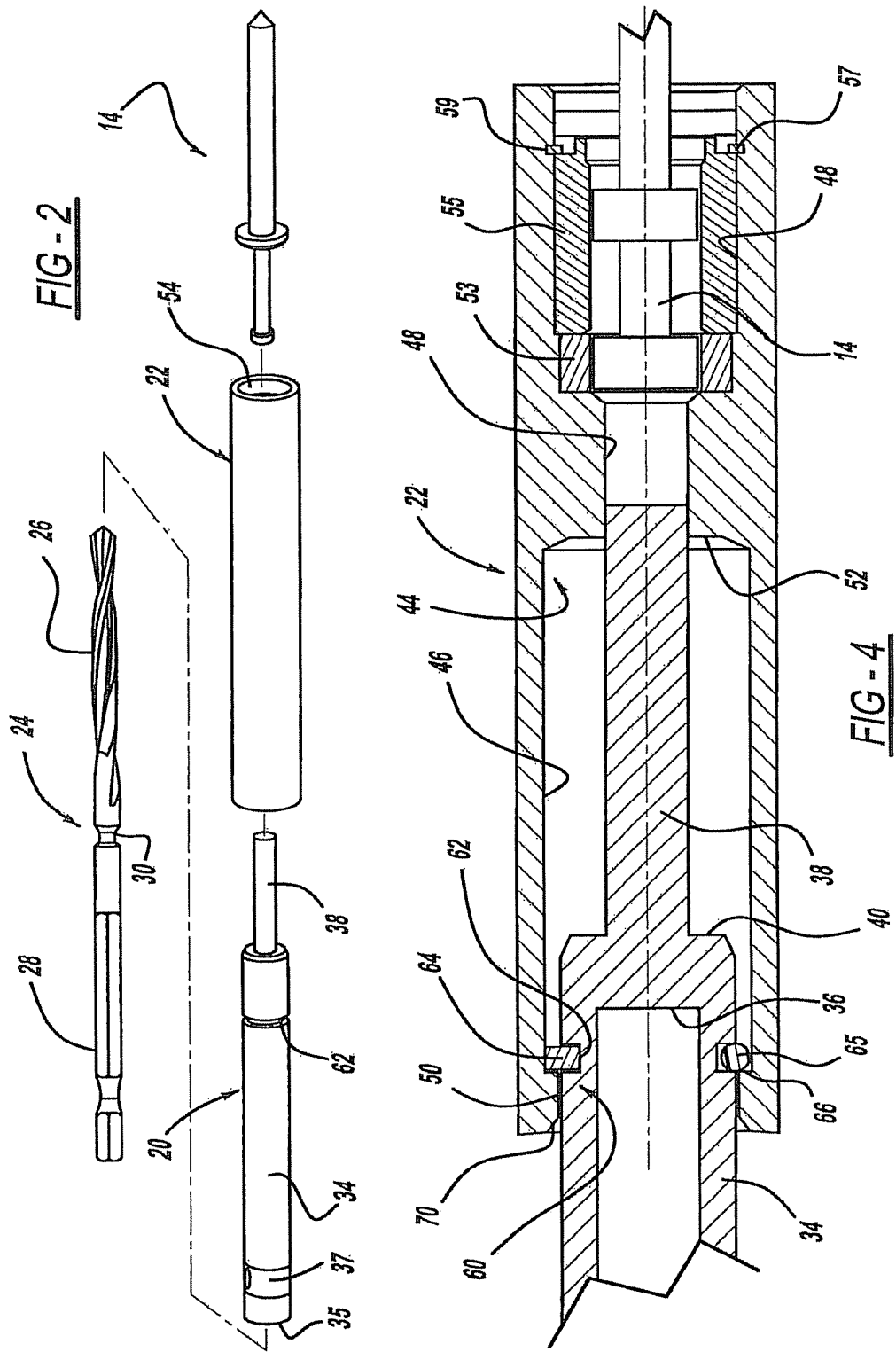

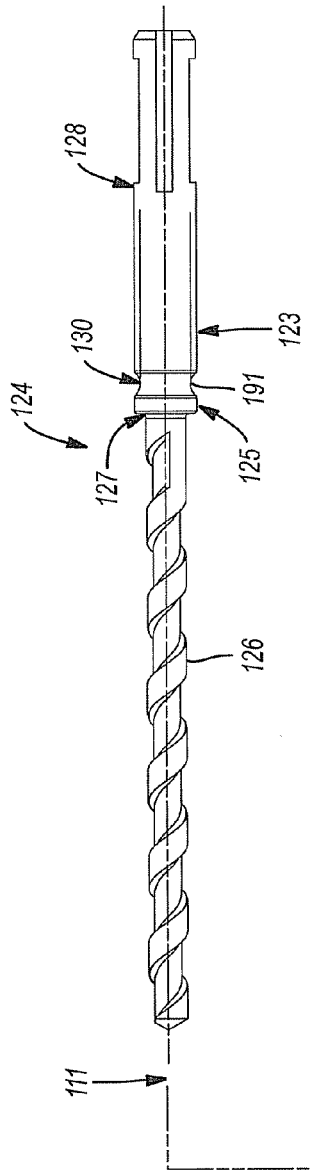
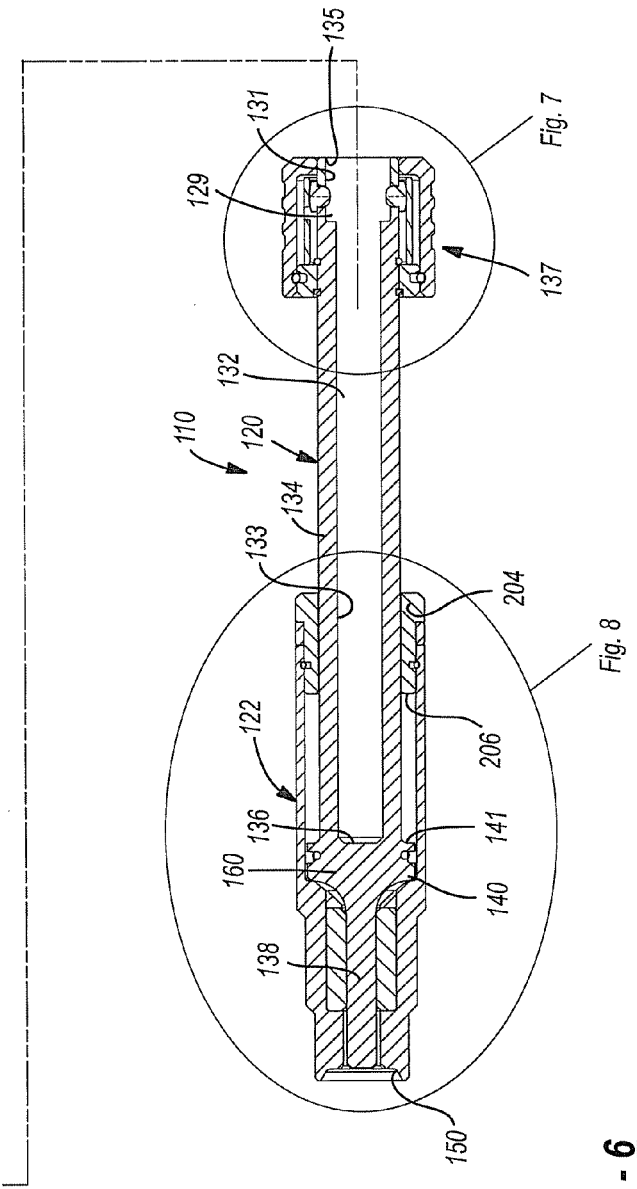
FIG-6

ANCHOR INSTALLATION TOOL

CROSS-REFERENCE TO RELATED APPLICATION

This application is a continuation-in-part of U.S. patent application Ser. No. 12/134,439, filed on Jun. 6, 2008, now U.S. Pat. No. 8,061,000. The entire disclosure of the above application is incorporated herein by reference.

FIELD

The present disclosure relates to masonry construction and, more particularly, to a tool to install anchors in masonry concrete or the like.

BACKGROUND

In the past, various types of anchor installation tools have been used. Ordinarily, a drill is used to form a hole in the concrete or masonry structure. The anchor is inserted into the bore. After that, a hammer is utilized to pound the anchor into the masonry material. While this application is satisfactory, it is time consuming and very demanding on the user. In fact, when anchors are to be inserted overhead, the user must pound upwardly with a hammer in order to sink the anchor into the structure. This is very demanding on the body of the user.

Other types of percussion tools are in the art. These tools enable a drill to be positioned into a hammer bit for drilling a bore into the concrete material. A beat piece is positioned on top of the drill in order to utilize the hammer drill to secure the anchor into the concrete or masonry material. While these tools function satisfactory for their intended purpose, designers strive to improve the art.

Accordingly, the present disclosure provides an anchor installation tool that eliminates the use of manual hammering. The present disclosure provides an anchor tool that is usable in tight spaces where the wielding of a hammer is difficult and time consuming. The present disclosure provides a simple yet effective tool to insert anchors into the concrete material. Additionally, the installation tool provides a guide to ensure proper alignment of the anchor in the bore.

SUMMARY

In accordance with the disclosure, an anchor installation tool comprises an elongated member with a body portion and a head portion. The body portion includes an internal bore to receive a drill bit. The head portion projects from and has a diameter smaller than the body portion. The head portion is coaxial with the body portion. An anchor guide is slidably secured on the elongated member. The anchor guide has a sleeve shaped body and a bore through the sleeve. The bore has a first portion size to fit over the body portion as well as a second portion size to fit over the head portion. The magnet is retained in the bore to enhance the retention of the anchor in the bore. Thus, the guide slides on the body and head portions. A mechanism retains the anchor guide on the body portion. The retaining mechanism enables the sliding movement of the anchor guide and prohibits removal of the anchor guide from the body portion. The retaining mechanism includes a groove in the body portion with a retaining member in the groove. A stop surface is on the anchor guide. The retaining member may be a retaining clip or an O-ring. The anchor guide includes a receiving portion to receive an anchor. The receiving portion is adjacent to the end of the second bore portion.

In accordance with a second aspect of the disclosure, an anchor installation tool comprises a drill bit and an elongated member with a body portion and a head portion. The body portion includes an internal bore to receive a drill bit. The head portion projects from and has a diameter smaller than the body portion. The head portion is coaxial with the body portion. An anchor guide is slidably secured on the elongated member. The anchor guide has a sleeve shaped body and a bore through the sleeve. The bore has a first portion size to fit over the body portion as well as a second portion size to fit over the head portion. The magnet is retained in the bore to enhance the retention of the anchor in the bore. Thus, the guide slides on the body and head portions. A mechanism retains the anchor guide on the body portion. The retaining mechanism enables the sliding movement of the anchor guide and prohibits removal of the anchor guide from the body portion. The retaining mechanism includes a groove in the body portion with a retaining member in the groove. A stop surface is on the anchor guide. The retaining member may be a retaining clip or an O-ring. The anchor guide includes a receiving portion to receive an anchor. The receiving portion is adjacent to the end of the second bore portion.

According to a further aspect, a method for setting an anchor comprises drilling a hole in a structure with a drill bit. The anchor is positioned into the tool. The tool has an elongated member with a body portion and a head portion. The body portion including an internal bore to receive the drill bit. The head portion projects from and has a diameter smaller than the body portion. The head portion is coaxial with said body portion. An anchor guide with a sleeve shaped body and through bore is fit over the body and the head portions. The anchor is positioned in the anchor guide bore. A percussive movement is provided on the drill bit. The percussive movement drives the anchor into the structure. The percussive movement is provided by a hammer drill.

In accordance with the disclosure, an anchor installation tool comprises an elongated driving member defining an axis and having a rear body portion and a front head portion extending frontward from the body portion. The head has an outer diameter that is smaller than an outer diameter of the body portion. The body portion defines an internal bore configured to receive a drill bit. The body portion further includes a retaining mechanism to retain the anchor installation tool onto the drill bit. The mechanism includes a housing on the body portion of the elongated driving member. A pair of biased lugs project through the body portion of the elongated driving member into a retention mechanism on the drill bit. An anchor guide has a sleeve body defining a bore with a rear portion sized to slidably receive the body portion of the driving member. The anchor guide has a front portion sized to slidably receive the head portion of the body member. The front portion further includes a holding member configured to releasably hold the anchor in the front portion of the bore. A stopping member is coupled to at least one of the driving member and the anchor guide to prevent complete removal of the driving member from the anchor guide. The anchor is held in the anchor guide and a drill bit is inserted into the driving member. Axial movement of the drill bit is transferred into axial movement of the driving member which causes the head portion to strike the anchor and eject the anchor from the anchor guide. The retention mechanism further includes a spring band in the housing to bias the lugs. An elastomeric sleeve is in the anchor guide acting as the holding member. The elastomeric sleeve includes a bore that defines a wall. The wall includes a corrugated pattern. A second internal coaxial bore is at the rear of the body portion of the driving member. The junction of the first and second internal bores defines a stop. The drill bit includes a groove positioned from a shoulder. The shoulder has a flat surface that contacts the stop between the first and second bore in response to the axial movement of the drill bit.

In accordance with an additional embodiment of the disclosure, an anchor installation kit includes a drill bit and an elongating member. The elongating member defines an axis and has a rear body portion and a front head portion that extends forward from the body portion. The outer diameter of the front head portion is smaller than the outer diameter of the body portion. The body portion defines an internal bore configured to receive the drill bit. A retaining mechanism retains the anchor installation tool onto the drill bit. The mechanism includes a housing on the body portion of the elongated member. A pair of biasing lugs projects through the body portion of the elongated member into the retention mechanism of the drill bit. An anchor guide has a sleeve body defining a bore with a rear portion sized to slidably receive the body portion of the driving member. A front portion is sized to slidably receive the head portion of the driving member. The front portion further includes a holding member configured to releasably hold an anchor in the front portion of the bore. A stopping member is coupled to at least one of the driving members in the anchor guide to prevent complete removal of the driving member from the anchor guide. The anchor is held in the anchor guide and the drill bit is inserted into the driving member. Axial movement of the drill bit is transferred to the axial movement of the driving member. This causes the head portion to strike the anchor and eject the anchor from the anchor guide. The retention mechanism further includes a spring band in the housing to bias the lugs. An elastomeric sleeve is in the anchor guide to provide an anchor holding member. The elastomeric sleeve includes a bore that defines a wall. The wall includes a corrugated pattern. A second internal coaxial bore is at the rear of the body portion of the driving member. The junction of the first and second internal bores defines a stop. The drill bit includes a groove positioned from a shoulder. The shoulder has a flat surface that contacts the stop, between the first and second bores, in response to the axial movement of the drill bit.

According to another embodiment of the disclosure, a drill bit for an anchoring tool comprises an elongated body. The body has a cutting portion and a shanking portion. The shanking portion includes a SDS shank and a peripheral groove spaced from the shank. A shoulder is at the junction of the cutting portion and the shanking portion. The shoulder includes a surface substantially perpendicular to an axis of the elongated body. The flat surface is spaced a desired distance from the groove so that when the drill bit is positioned in the anchoring tool, the flat surface contacts a stop in the anchoring tool. This enables the drill bit to transfer axial movement to the anchoring tool. The elongated body is a unitary construction. The cutting portion is of a masonry type.

From the following detailed description taken in conjunction with the accompanying drawings and claims, other objects and advantages will become apparent from the disclosure.

DRAWINGS

The drawings described herein are for illustration purposes only and are not intended to limit the scope of the present disclosure in any way.

FIG. 1 is a perspective view of a hammer drill and installation tool driving an anchor into a structure.

FIG. 2 is an exploded view of the anchor tool of FIG. 1.

FIG. 3 is a cross-section view of FIG. 2 along line 3-3 thereof.

FIG. 4 is an enlarged cross-section view of FIG. 3.

FIG. 6 is a view like FIG. 3 of a second embodiment with the drill bit in plan view and the anchor tool in cross-section.

DETAILED DESCRIPTION

Figure 5A:
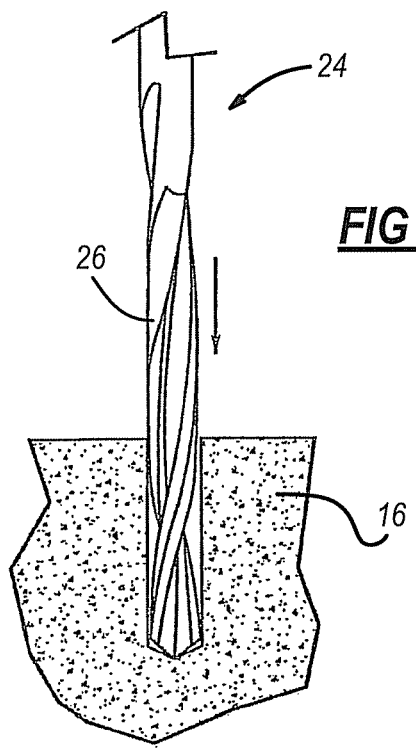
FIG. 5A-5C are a schematic illustrations of positioning an anchor into a concrete structure.

The following description is merely exemplary in nature and is not intended to limit the present disclosure, application, or uses.

Turning to the figures, an installation tool in accordance with the disclosure is illustrated and designated with the reference numeral 10. A hammer drill 12 is illustrated receiving the anchor installation tool 10. A nail-in anchor 14 is illustrated being secured into a structure 16.

Moving to FIGS. 2 and 3, the anchor installation tool 10 is illustrated. The installation tool 10 includes an elongated member 20 and an anchor guide 22. Additionally, the installation tool 10 can be combined with a drill bit 24. The drill bit 24 includes a front fluted portion 26, and intermediate portion 23, and rear a chucking portion 28. The intermediate portion 23 includes a groove 30 to assist in retaining the installation tool 10 on the drill bit 24, as described in further detail below. The intermediate portion 23 also includes a shoulder 25 disposed at the junction between the intermediate portion 23 and the fluted portion 26, which shoulder includes a substantially flat surface 27 substantially transverse to the drill axis. The chucking portion 28 is configured to enable the drill bit 24 to be held in the chuck or tool holder of a hammer drill 12. In the illustrated embodiment, the chucking portion includes a hexagonal shank with a groove to position the drill bit 24 into the hammer drill 12. However, it should be understood that the chucking portion 28 can include other types of connectors such as a round shank, a hexagonal shank without a groove, a square shank, and/or a shank with an SDS-type connection.

The elongated body 20 includes an internal bore 32 extending through a body portion 34 of the elongated member 20. The body portion 34 generally has a desired diameter and a desired wall thickness with an open end 35 and a closed 36 end. The closed end 36 of the body member 34 includes a projecting head 38. The head 38 projects substantially coaxial with the body member 34. The internal bore 32 includes a first portion 33 and a second portion 31. The first and second portions 33, 31 are positioned coaxially and define a stop 29 at the transition between the first 33 and second 31 bore portions. The head 38 has a desired length and diameter. Ordinarily, the head 38 is a solid portion.

A drill bit retainer 37 is positioned near the open end 35. The drill bit retainer 37 includes a ball 39, and a spring clip 41. The ball 39 is seated in a bore 43 in the body portion 34. A portion of the ball 39 projects through the bore 43 into bore 31. The ball 39 couples with the drill bit groove 30 to retain the installation tool 10 on the drill bit 24. The annular groove 30 is positioned a desired distance from the flat surface 27 so that when the drill bit 24 is positioned in the anchor tool 10, the flat surface 27 of the drill bit 24 contacts the stop 29 in the anchoring tool 10 for transferring axial movement of the drill bit 24 to the anchoring tool 10 to provide axial movement of the anchoring tool 10, as described in greater detail below.

The elongated member 20 is generally made out of a metallic material such as steel. The junction where the head 38 projects from the closed end 36 forms a stop surface 40 at the end of the body portion 34. The stop surface 40 contacts a stop surface of the anchor guide 22 as will be explained later.

The anchor guide 22 has a sleeve-shaped body 42. The sleeve 42 includes an internal bore 44 which extends through the sleeve shaped body 42. The bore 44 includes a first portion 46, a reduced diameter portion 47, a second portion 48 and end portion 50. The first portion 46 is sized to fit over the body portion 34 of the elongated member 20. The reduced diameter portion 47 is sized to fit over the head portion 38. A stop 52 is formed at the transition between the two bore portions 46, 47. The stop 52 provides a surface that abuts against the surface 40 to stop further movement of the guide anchor 22 as it slides along the head 38 and body portions 34.

The second bore portion 48 is on the other side of the reduced diameter portion 47. The second portion 48 receives an annular magnet 53 and spacer 55. The magnet assists in retaining the anchor in the tool 10. The magnet 53 acts as a retention member when a duply or double head nail is used as the anchor as shown in FIG. 4. The spacer 55 positions the magnets 53 adjacent the reduced diameter portion 47. A C-clip 57 positioned in groove 59 holds the spacer 55 and magnet in the second bore portion 48. It should be understood that other types of retention members, such as an elastomeric ring or a friction fit, can be used in addition to or instead of the magnet.

An anchor receiving member 54 is at the end of the second bore portion 48 beyond groove 59. The receiving member 54 is an enlarged bore that receives the head of the anchor 14. With the nail portion of the anchor extending into the bore 48 adjacent the magnet 53, and its head captured in the receiving member 54 the anchor 14 is held in the anchor guide 22 so that it may be inserted into a bore in a concrete structure as seen in FIG. 5A.

Turning to FIG. 4, an enlarged cross-sectional view of the retention mechanism is illustrated. The retention mechanism 60 includes a groove 62 a retaining clip 64 and a stop surface 66 on the anchor guide 22. The groove 62 is formed into the outer surface of the body member 34. The groove 62 is circumferentially spaced about the body member 34. A retention clip 64, generally a C-clip, is positioned onto the body member 34. The retention clip 64 extends radially outwardly above the body member 34 from the groove 62 as seen in FIG. 4. Thus, the retaining clip 64 acts as a stop when the guide member 22 is slid forward on the head 38 and the body member 34. The stop surface 66 is formed at the junction of the first bore portion 46 and the end portion 50. The end portion 50 has a diameter slightly smaller than the first bore portion 46.

A chamfer 70 is formed at the end of the guide member 22. The chamfer 70 enables the guide member 22 to slide over top of the C-clip 64, compressing it radially inward to move over the C-clip 64 to retain the guide 22 on the body portion 34. Thus, after an anchor is set into the concrete structure, the guide 22 is pulled forward, toward head 38, on the body portion 34 until the stop surface 66 contacts the retention clip 64. In an alternative embodiment, an O-ring 65 is utilized as illustrated on the bottom half of FIG. 4. The O-ring 65 acts in the same manner to retain the guide member 22 on the body portion 34.

Figure 5B:
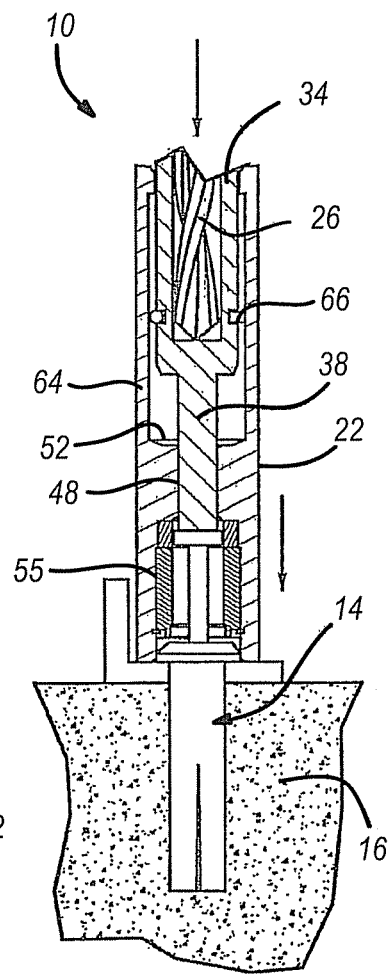
Figure 5C:
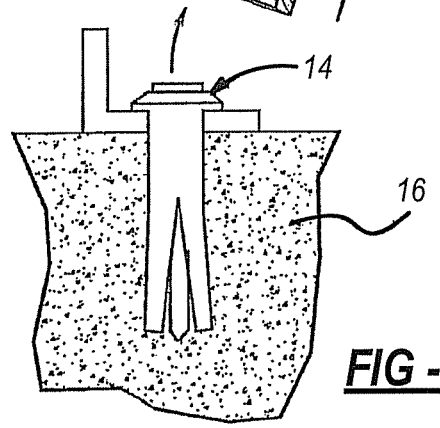
Figure 7:
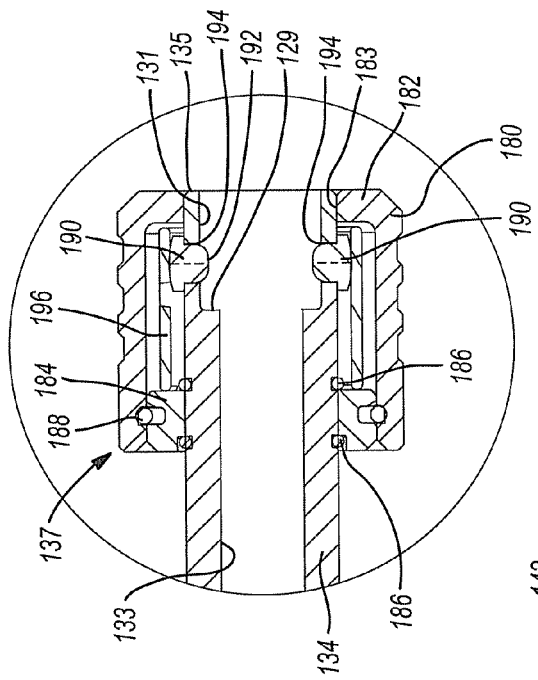
FIG. 7 is an enlarged view of FIG. 6 within circle 7.

A method of using the anchor installation tool to insert a nail-in type anchor 14 is as follows. The anchor 14 includes a front expandable portion 11 with expandable legs 19, a large diameter intermediate flange 13, and a small diameter rear head 15 that can be driven into the front expandable portion 11 to cause the legs 19 to expand. If already coupled, the anchor installation tool 10 is removed from the drill bit 24, and the drill bit 24 is coupled to the hammer drill 12. The drill bit 24 is used to drill a hole or bore into a workpiece, e.g., a concrete structure 16, to a desired depth as illustrated in FIG. 5A. The elongated body member 34 of the tool 10 is then positioned over the drill bit as illustrated in FIG. 3. Additionally, the guide member 22 is extended so that the stop surface 66 engages the retention clip 64. The nail-in type anchor 14 is positioned with the rear head 15 in the second bore portion 48 adjacent magnet 55, and a head of the insert in the receiving portion 52 of the guide 22 as seen in FIG. 5B. The front portion 11 of the anchor 14 is inserted into the concrete hole or bore as illustrated in FIG. 5B. If necessary, the hammer drill is activated to percussively pound the front portion 11 of the nail into the concrete hole or bore. The axial movement of the drill bit 24 is transferred, via the contact of the flat surface 27 with stop 29, into axial movement of the driving member 34. This causes the head portion 38 to strike the anchor head 15 to seat the front portion 11 of the anchor 14 into the workpiece. Once the front portion 11 is seated, the rear head 15 is further pounded by head portion 38 into the front portion 11 to spread the legs 18 as illustrated in FIG. 5C. After the anchor 14 has been set, the anchor installation tool 10 is removed from the nail and the drive guide 22 is positioned back over the head 38 of the elongated member 20 ready for its next use.

Turning to FIGS. 6-9F, second embodiments of an installation tool 110 and a drill bit 124 in accordance with the disclosure are illustrated. The reference numerals that relate to similar elements in FIGS. 1-5C have been designated with reference numerals increased by 100.

The drill bit 124 includes a front fluted masonry portion 126, an intermediate portion 123, and a shank portion 128. The shank portion 128 includes a connector for connecting the drill bit to a power tool chuck or tool holder, in this embodiment an SDS-type connector 129. A shoulder 125 is formed at the transition between the fluted portion 126 and intermediate portion 123. The shoulder 125 includes a 45 degree chamfer adjacent the flat surface 127. The chamfer 121 enhances the insertion into the bore 131. A small radius portion 119 is positioned at the transition of the cutting portion 126 and the intermediate portion 127. The radius of the small radius portion 119 is approximately 0.75 mm or less. This enhances the strength of the drill bit 124. The shoulder 125 includes a substantially flat surface 127 that is oriented substantially transverse to a drill bit axis 111. The intermediate portion 123 includes an annular groove 130 configured to releasably connect the drill bit 124 to the installation tool 110. The annular groove 130 is positioned a desired distance from the flat surface 127 so that when the drill bit 124 is positioned in the anchoring tool 110, the flat surface 127 contacts a stop 129 in the anchoring tool 110 for transferring axial movement of the drill bit 124 to the anchoring tool 110 to provide axial movement of the anchoring tool 110, as described in greater detail below. Generally, the distance from the groove center to the flat surface 127 is between approximately 4.65 and approximately 4.85 mm.

The anchor installation tool 110 includes an elongated driving member 120 and an anchor guide 122. The elongated body 120 includes an internal bore 132 extending through a body portion 134 of the elongated driving member 120. The body portion 134 generally has a desired diameter and a desired wall thickness with a rear open end 135 and a forward closed end 136. The internal bore 132 includes a first portion 133 and a second portion 131. The first and second portions 133, 131 are positioned coaxially and define the stop 129 at the transition between the first 133 and second 131 bore portions. The closed end 136 of the body member 134 includes a forward projecting head 138. The head 138 projects substantially co-axial with the body member 134. The head 138 has a desired length and diameter. Ordinarily, the head 138 is a solid portion that projects from the body. A drill bit retainer 137 is positioned near the open end 135.

The retainer 137 includes an annular housing 180 supported on the opened end 135 of the body member 134. The housing 180 has a sleeve configuration with an opened end and a flange end 182. The flange end 182 defines a bore 183 with a wall that rests on the body portion 134. A bushing 184 is positioned in the open end 181 of the sleeve. Hog rings 186 retain the bushing 184 onto the body portion 134. Additionally, hog ring 188 retains the bushing 184 onto the housing 180. A pair of lugs 190 is held in bores 194 in the body portion 134. The lugs 190 have an arcuate surface 192 that seats in the groove 130 of the drill bit 124. The bores 194 extend into the second internal bore portion 131 of the body portion 134. A spring band 196 biases the lugs 190. The spring band 196 enables the lugs 190 to move radially inward and outward into the retention groove 130 of the drill bit 124. The retention groove 130 has an arcuate surface 192 that enables the lugs 190, via surface 192, to be moved axially along the drill bit 124 into and out of the groove 130 due to the configurations of the surfaces 191 and 192. Thus, the retention member 137 is slid on and off of the drill bit 124.

The elongated member 120 is generally made out of metallic material such as steel. The junction where the head 138 projects from the closed end 136 forms a stop surface 140. The stop surface 140 contacts a first stop surface of the anchor guide 122 as will be explained later. Additionally, the junction of the head and closed end includes a second stop surface 141 that contacts a second stop surface of the anchor guide 122 as will be explained later.

The anchor guide 122 has a sleeve shaped body 142. The sleeve 142 includes an internal bore 144 that extends through the sleeve shaped body 142. The bore 144 includes a first portion 146, a second diameter portion 147, a third diameter portion 148, and an end portion 150. The first portion 146 is sized to fit over the body portion 134 of the elongated drive member 120. The reduced diameter portion 147 is sized to receive an elastomeric sleeve 200. A first stop 152 is formed at the transition between the two bores 146, 147. The first stop 152 provides a surface that abuts against the stop surface 140 to further stop movement of the anchor guide 122 as it slides along the head 138 and the body portion 134. The third bore portion 148 is on the other side of the reduced diameter portion 147. The third bore portion 148 is sized to receive the head portion 138 of the body portion 134. The end portion 150 is at the end of the third bore 148. The end portion 150 is an enlarged bore that receives the head of the anchor 14. The nail portion of the anchor extends into bore 148 and is received in a bore 202 of the elastomeric sleeve 200. The bore 202 is defined by a wall 204 that includes a corrugated pattern, with furrows and ridges, to receive the nail portion of the anchor 14. The furrows and ridges receive the head of the nail and hold the anchor 14 in position on the guide anchor 122.

Figure 8:
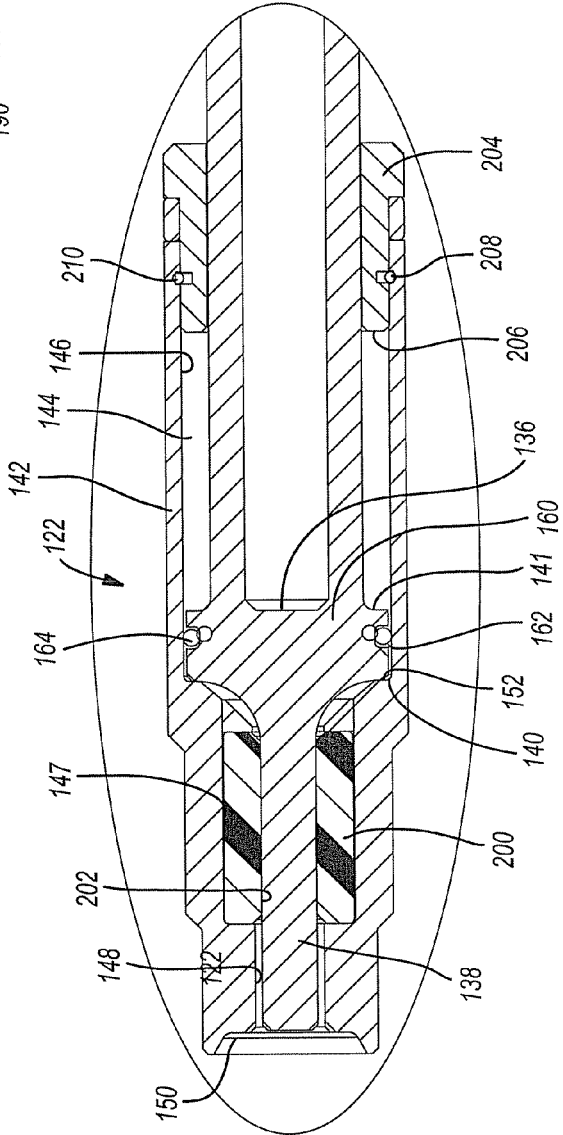
FIG. 8 is an enlarged view of FIG. 6 within circle 8.
Figure 9:
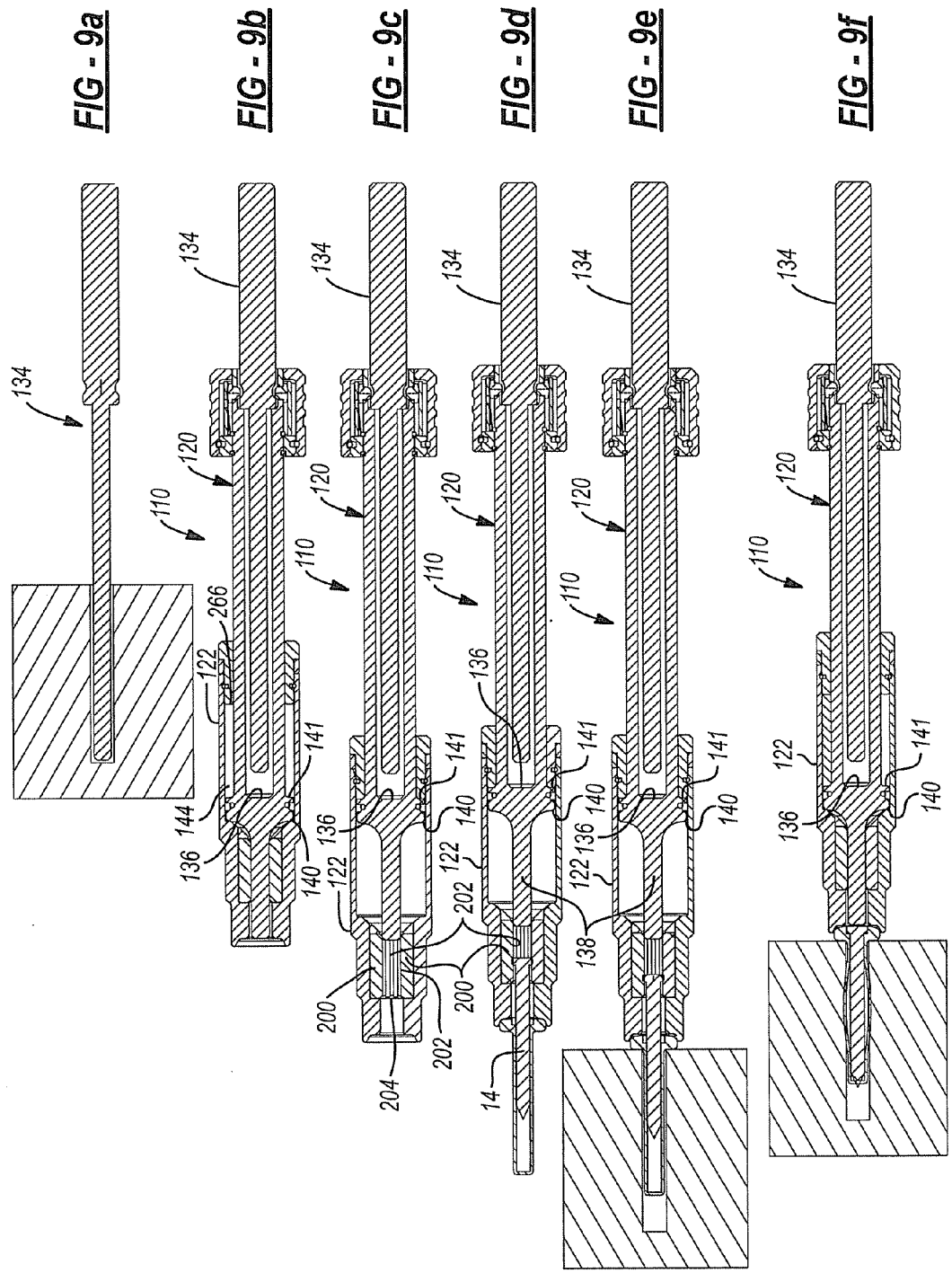
FIG. 9A-9F are schematic illustrations of positioning an anchor into a concrete structure.
Figure 10:
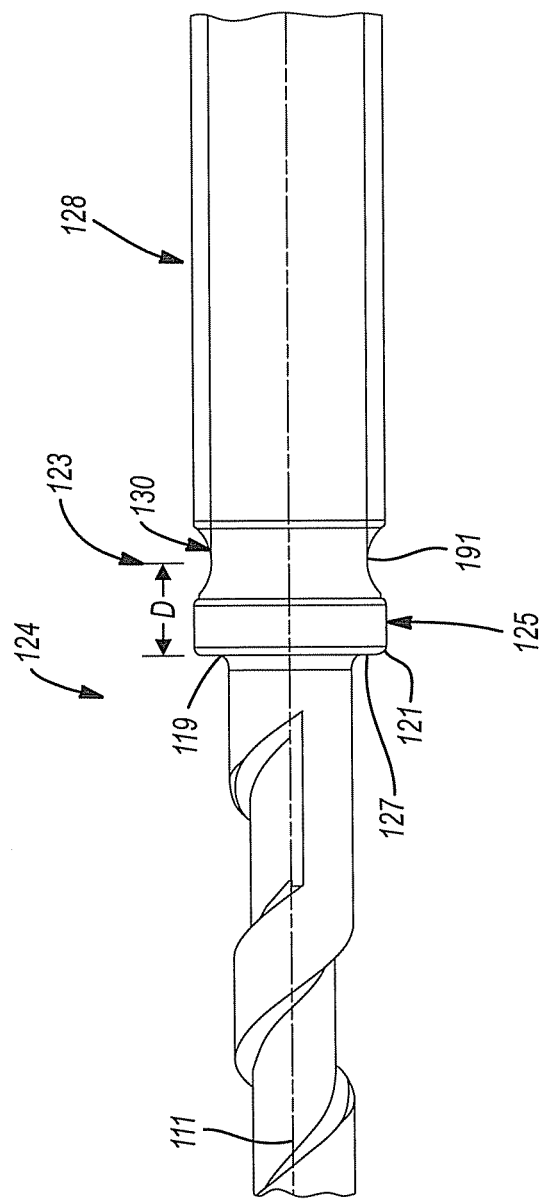
FIG. 10 is an enlarged view of FIG. 6 within circle 10.

Turning to FIG. 8, an enlarged cross-sectional view of the anchor guide 122 is illustrated. The anchor guide includes an annular bushing 204 retained at the end of the first bore 146. The bushing 204 provides a second stop 206 that contacts the stop 141 of the junction between the head 138 and the closed end 136. The bushing 204 is retained in the first bore 146 by a hog clip 208 that extends into a groove 210 in the wall of the anchor guide 122.

The junction 160 of the head 138 and body 134 includes a groove 162 that includes an O-ring 164 that maintains smooth movement of the anchor guide 122 on the body member 134. The stop 141 contacts second stop 206 of the bushing 204 to prohibit further movement anchor guide 122 along the body 134. The junction 160 has a slightly larger diameter than the rest of the body 134. This portion provides stops 140, 141 that contact the anchor guide 122 as it is moved from position to position.

A method of using the anchor installation tool 110 to insert the nail-type anchor 14 described above is illustrated in FIGS. 9A-9F. The drill bit 124 is inserted into the chuck of the hammer drill, and is used to drill a hole or bore into a workpiece, e.g., a concrete structure, to a desired depth as illustrated in FIG. 9A. The elongated body member 134 of the anchor installation tool 110 is then positioned over the drill bit as illustrated in FIG. 9B. The lugs 190, via surface 192, slide on the intermediate surface 127. The lugs 190 are biased by spring band 196 into the groove 130 to lock the retention member 137 onto the drill bit 124. The guide member 122 is extended from the body member 134 until the stop 144 contacts stop 206, as illustrated in FIG. 9C. The nail-in type anchor 14 is positioned with the nail portion head 15 inside the bore 202 of the elastomeric sleeve 200. The corrugated wall 204 holds the head 15 in the elastomeric sleeve 200, as seen in FIG. 9D. The front portion 11 of the anchor 14 is inserted into the concrete hole or bore as illustrated in FIG. 9E. If necessary, the hammer drill is activated to percussively pound the front portion 11 of the anchor 14 into the workpiece. The axial movement of the drill bit 124 is transferred, via the contact of the flat surface 127 with stop 129, into axial movement of the driving member 134, which causes the head portion 138 to strike the anchor head 15 and seat the front portion 11 of the anchor 14 in the workpiece. Next, the tool further drives the head 15 into the front expandable portion 11, causing legs 19 on the front expandable portion 11 to expand to help retain the anchor 14 in the workpiece, as shown in FIG. 9F. After the anchor 14 has been set, the anchor installation tool 110 is removed from the nail and the drive guide 122 is positioned back over the head 138 of the elongated member 120 for its next use.

The description of the invention is merely exemplary in nature and, thus, variations that do not depart from the gist of the invention are intended to be within the scope of the invention. For example, the first embodiment of the drill bit could be used with the second embodiment of the anchor installation tool, and the second embodiment of the drill bit could be used with the first embodiment of the installation tool. In addition, either embodiment of the anchor installation tool could be used to insert and seat anchors, nails, or other fasteners other than the nail-in type anchor described above. These and other variations are not to be regarded as a departure from the spirit and scope of the invention.

What is claimed is:

1. An anchor installation tool comprising:
  an elongated driving member defining an axis and having a rear body portion and a front head portion extending frontward from the body portion and having an outer diameter that is smaller than an outer diameter of the body portion, the body portion defining an internal bore with an internal shoulder configured to receive a drill bit, the body portion further including a retaining member configured to engage with the drill bit to inhibit removal of the drill bit from the rear body portion, the retaining member including a biased lug projecting through a window in the body portion into a recess in the drill bit;

an anchor guide having a sleeve body defining a bore having a rear portion sized to slidably receive the body portion of the driving member and a front portion sized to slidably receive the head portion of the driving member, the front portion further including a holding member configured to releasably hold an anchor in the front portion of the bore; and a stopping member coupled to at least one of the driving member and the anchor guide to prevent complete removal of the driving member from the anchor guide, wherein when an anchor is held in the anchor guide and a drill bit is inserted into the driving member, axial movement of the drill bit is transferred via the internal shoulder to axial movement of the driving member, which causes the head portion to strike the anchor.

2. The anchor installation tool of claim 1, wherein the retaining member includes a housing on the body portion of the elongated member and the biased lug comprises a pair of biased lugs projecting through the body portion of the elongated member.

3. The anchor installation tool of claim 2, further comprising a spring band in the housing for biasing the lugs.

4. The anchor installation tool of claim 1, wherein the holding member further comprises an elastomeric sleeve.

5. The anchor installation tool of claim 4, further comprising a bore in the elastomeric sleeve, the bore defines a wall that includes a corrugated pattern.

6. The anchor installation tool of claim 1, further comprising a stop formed at a transition between the rear portion and the front portion of the anchor guide bore.

7. The anchor installation tool of claim 1, wherein the biased lug is positioned axially rearward of the internal shoulder.

8. The anchor installation tool of claim 1, wherein the drill bit has a rear chucking portion, a front cutting portion, and an intermediate portion, and the biased lug is configured to engage a recess disposed in the intermediate portion of the drill bit.

9. An anchor installation kit comprising:

a drill bit having a front cutting portion, an intermediate portion having a groove, a rear chucking portion, an a substantially transverse shoulder at a junction between the front cutting portion and the intermediate portion;

an elongated driving member defining an axis and having a rear body portion and a front head portion extending frontward from the body portion and having an outer diameter that is smaller than an outer diameter of the body portion, the body portion defining an internal bore with an internal shoulder configured to receive the drill bit, the body portion further including a retaining member including a biased lug projecting through a window in the body portion to engage with the groove on the drill bit to inhibit removal of the drill bit from the rear body portion;

an anchor guide having a sleeve body defining a bore having a rear portion sized to slidably receive the body portion of the driving member and a front portion sized to slidably receive the head portion of the driving member, the front portion further including a holding member configured to releasably hold an anchor in the front portion of the bore; and a stopping member coupled to at least one of the driving member and the anchor guide to prevent complete removal of the driving member from the anchor guide, wherein when an anchor is held in the anchor guide and a drill bit is inserted into the driving member, axial movement of the drill bit is transferred to axial movement of the driving member via engagement between the shoulder of the drill bit and the internal shoulder of the driving member, which causes the head portion to strike the anchor.

10. The anchor installation tool of claim 9, wherein the retaining member includes a housing on the body portion of the elongated member and the biased lug comprises a pair of biased lugs projecting through the body portion of the elongated member.

11. The anchor installation kit of claim 10, further comprising a spring band in the housing for biasing the lugs.

12. The anchor installation kit of claim 9, wherein the holding member further comprises an elastomeric sleeve.

13. The anchor installation kit of claim 9, further comprising a stop formed at a transition between the rear portion and the front portion of the anchor guide bore.

14. The anchor installation kit of claim 9, wherein the biased lug is positioned axially rearward of the internal shoulder.

15. The anchor installation kit of claim 9, wherein the groove comprises an annular groove.

16. The anchor installation kit of claim 9, wherein the shoulder includes a substantially flat surface oriented substantially perpendicular to a drill bit axis.

17. The anchor installation kit of claim 16, wherein the substantially flat surface is spaced approximately 4.65 mm to approximately 4.85 mm from the groove.

18. The anchor installation kit of claim 16, wherein the shoulder further includes a chamfered surface between the substantially flat surface and the intermediate portion.

19. The anchor installation kit of claim 16, wherein the shoulder further includes a radiused surface between the substantially flat surface and the cutting portion.

* * * * *